United States Patent
Matula et al.

(10) Patent No.: US 11,677,873 B2
(45) Date of Patent: Jun. 13, 2023

(54) ARTIFICIAL VENTRILOQUIST-LIKE CONTACT CENTER AGENTS

(71) Applicant: Avaya Management L.P., Durham, NC (US)

(72) Inventors: Valentine C. Matula, Granville, OH (US); Shamik Shah, Pune (IN)

(73) Assignee: Avaya Management L.P., Durham, NC (US)

( * ) Notice: Subject to any disclaimer, the term of this patent is extended or adjusted under 35 U.S.C. 154(b) by 56 days.

(21) Appl. No.: 17/104,725

(22) Filed: Nov. 25, 2020

(65) Prior Publication Data

US 2022/0166880 A1     May 26, 2022

(51) Int. Cl.
*H04M 3/51*     (2006.01)
*G10L 13/08*    (2013.01)
*G10L 13/027*   (2013.01)

(52) U.S. Cl.
CPC ........ *H04M 3/5166* (2013.01); *G10L 13/027* (2013.01); *G10L 13/086* (2013.01); *H04M 3/5175* (2013.01)

(58) Field of Classification Search
CPC . H04M 3/5166; H04M 3/5175; G10L 13/027; G10L 13/086
See application file for complete search history.

(56) References Cited

U.S. PATENT DOCUMENTS

| | | | |
|---|---|---|---|
| 8,634,543 B2 | 1/2014 | Flockhart et al. | |
| 11,172,162 B1* | 11/2021 | Tamayo | G06Q 40/08 |
| 11,258,902 B2* | 2/2022 | Beaver | H04M 3/5166 |
| 11,366,997 B2* | 6/2022 | Marggraff | G10L 15/22 |
| 11,556,755 B2* | 1/2023 | Publicover | H04N 21/42203 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2021/0119945 A1* | 4/2021 | Sohum | G06F 40/56 |
| 2021/0136207 A1* | 5/2021 | Adibi | G10L 13/027 |
| 2021/0358188 A1* | 11/2021 | Lebaredian | G10L 13/08 |
| 2022/0141335 A1* | 5/2022 | Beaver | G06F 40/30 379/265.09 |
| 2022/0165256 A1* | 5/2022 | Maheswaran | G10L 13/08 |
| 2022/0174153 A1* | 6/2022 | Spohrer | G06N 20/00 |

* cited by examiner

*Primary Examiner* — Lisa Hashem
(74) *Attorney, Agent, or Firm* — Sheridan Ross P.C.

(57) ABSTRACT

The need for efficient and effective communications is of key importance to contact centers. Agent communications with customers are designed to maximize results while minimizing resources, in particular the time required for human agents to be engaged with a particular customer. Often the impact of two agents on a communication can both improve customer satisfaction and better produce the intended result of the communication. However, two (or more) live agents is resource intensive. By providing a virtual agent controlled, entirely or in part, by a live agent, the customer may be presented with the appearance of two agents while requiring the human resources of a single agent.

20 Claims, 7 Drawing Sheets

ARTIFICIAL VENTRILOQUIST-LIKE CONTACT CENTER AGENTS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communications over a network and particularly to providing a multi-party communication with a generated participant.

BACKGROUND

In a customer interaction with a contact center, customers typically communicate with only a single agent, such as via audio and/or video communications. While this one-on-one communication may often be sufficient, customers or agents may want another agent to join the communication. For example, a customer may ask to speak to a supervisor, or an agent may determine that another agent, such as one having specialized knowledge or authority, is required in order to successfully conclude the communication. Additionally, a customer communicating with a single agent may have a limited ability to maintain a customer's focus, especially for longer periods of time.

SUMMARY

These and other needs are addressed by the various embodiments and configurations of the present invention. The present invention can provide a number of advantages depending on the particular configuration. These and other advantages will be apparent from the disclosure of the invention(s) contained herein.

Prior art contacts center often provide a single-agent communication mechanism. During a communication, commonly a voice call or video call, if a customer is provided with an additional affirmation to what the agent is saying, it may have a positive psychological effect on the customer. Additionally, a customer may request a manager or other supervisor, while none are presently available, or the current agent is capable of handling the customer's request. Therefore, and in one embodiment, a multi-agent communication is disclosed with the customer, the agent, and pseudo-human agent providing content to the communication determined by the agent.

One of the agent in the communication takes up the role of a primary agent (Agent A1) talking with the customer. Whether the communication is a voice only call or voice and video, at any point in time a second "agent" can be added to the conversation (Agent V2). This second personality is part of the conversation and the customer would be made aware of Agent V2 joining the call.

Agent A1 then controls Agent V2, at least in part. For example, Agent A1 may type in the exact speech for Agent V2 to "speak," via text-to-speech generation and to provide a pattern of speech (e.g., tone, pace, inflection, accent, etc.) that is, at least, different from that of Agent A1. Alternatively, Agent A1 may be muted, with respect to speech going to the customer, and the speech then being converted to the voice persona of Agent V2. As a benefit, the call has the appearance of two live agents without the resource requirements of two live agents. Agent V2 may have the persona of an expert in a field, a supervisor, a past product user, or a customer that is a close demographic match to that of the customer. In difficult conversations, such as collections, one of Agent A1 or Agent V2 may be an "enforcer", supervisor, or other roll with the other of Agent A1 or Agent V2 being more understanding, sympathetic, and friendly—commonly known as, "good cop, bad cop," roles. Accordingly, roles of Agent A1 and Agent V2 may be reversed, such as when Agent V2 becomes the primary speaker and the human agent, Agent A1, being the secondary speaker. Additionally or alternatively, Agent V2 may be the only speaker initially on the call with Agent V1 joining later—as presented to the customer.

In another embodiment, the primary (human) agent may be like a puppeteer or ventriloquist providing or cueing the secondary (virtual) agent to speak and/or gesture, provide inflections, facial expressions, etc. as commanded by the primary agent. It should be appreciated that the primary agent need not provide their own voice or visual presence on the call and may control one, two, or more automated agents each engaged with the customer and, as presented to the customer, engaged with each other. In yet another embodiment, two or more live agents may be included on a call along with a virtual agent, which may further comprise a plurality of virtual agents with a portion of the plurality of virtual agents controlled by one live agent and a different portion controlled by a second live agent. Additionally or alternatively, a virtual agent may be controlled by the primary agent, such as to provide the primary agent to the call while an actual live supervisor becomes available. Once the actual live supervisor is available, the supervisor may take control from the human agent and continue the call. The call may then end, or the supervisor may relinquish control of the virtual agent back to the primary agent and continue the call.

In another embodiment, an automated agent service generates appropriate logging events in order for the downstream reporting, analytics, WFO, and QM systems (or any other consumer of those events) to know whether an agent utilized a virtual agent on a specific call, or whether a customer is being served by multiple live agents. In another embodiment, the real-time monitoring application provides a clear view to the supervisor for whether multiple real/dummy agents are being engaged on a call. In another embodiment, the reporting application provides real time and historical reports specifying contacts handled by multiple real/dummy agents, specifying list of customers served thru ventriloquism and their success rates.

Routing systems can be set up to identify incoming contacts that would benefit from multiple 'agent' interactions, comprising at least one virtual agent, and thus route the call to live agents with sufficient virtual agent controlling skills.

Personalities of the virtual agents, as controlled by the live agent, may be cataloged and their associated successes/failures identified. A system may then attempt to match a virtual agent personality to that of a customer and provide that agent personality via automated portions of speech (e.g., word/phrasing choices, inflection, pace, accent, etc.) and/or appearance (e.g., gestures, expressions, etc.) for a virtual agent. Additionally or alternatively, the virtual agent may be a secondary agent or a primary agent. If a particular personality for an automated agent is determined to match a particular customer, then a live agent may be identified to join the call that has a complementary personality to that of the virtual agent. Additionally or alternatively, a live agent's use of a virtual agents may be scored and evaluated, such as for particular types of calls (e.g., collections vs selling, etc.). Routing can take into account relative ability of a person to project another personality simultaneously on a call depending on requirements or purpose of the call. Scoring may also trigger feedback, live or automated coaching, or other training for the live agent to better utilize the capabilities of the virtual agent.

In one embodiment, a system is disclosed, comprising: a communication interface to a network; a processor, comprising machine-readable instructions maintained in a non-transitory memory; a first agent communication device, comprising an input device and a microphone and utilized by a live agent; a data storage; and wherein a first agent, via the first agent communication device is engaged in a communication with a customer, utilizing a customer communication device, and wherein the communication comprises speech encoded for transmission on the network; and wherein the instructions cause the processor to perform: accessing an agent persona, from the data storage, comprising settings of characteristics to generate speech of a virtual agent different from the speech of the first agent; receiving content, via the input device; generating speech of the content in the voice of the persona; and providing the generated speech as a portion of the communication.

In another embodiment a method is disclosed, comprising: engaging in a communication with a customer, utilizing a customer communication device connected to a network, with a first agent utilizing a first agent communication device connected to a network and wherein the communication comprises speech encoded for transmission on the network; accessing an agent persona, from a data storage, comprising settings of characteristics to generate speech of a virtual agent different from the speech of the first agent; receiving content, via an input device associated with the first agent communication device; generating speech of the content in the voice of the persona; and providing the generated speech as a portion of the communication.

In another embodiment, an agent communication device for communicating, via a network with a customer communication device is disclosed, comprising: a communication interface to the network; a processor, comprising machine-readable instructions maintained in a non-transitory memory; a microphone capturing speech of an agent; a camera capturing a video image of the agent; a data storage; and wherein an agent, utilizing the agent communication device, is engaged in a communication with a customer, utilizing the customer communication device, and wherein the communication comprises speech encoded for transmission on the network; and wherein the instructions cause the processor to perform: accessing a virtual agent persona, from the data storage, comprising settings of characteristics to generate a virtual agent different from the first agent; generating the virtual agent to comprise speech of the agent and having the voice of the virtual agent persona; generating a video image of the virtual agent having at least a movement as determined by a movement of agent as captured in the video image of the virtual agent; generating an altered video image of the agent having the appearance of not speaking while the video image of the virtual agent is speaking; and providing, as a portion of the content, the video image of the virtual agent, the altered video image of the agent, and speech in the voice of the virtual agent persona; and providing the generated speech as a portion of the communication.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
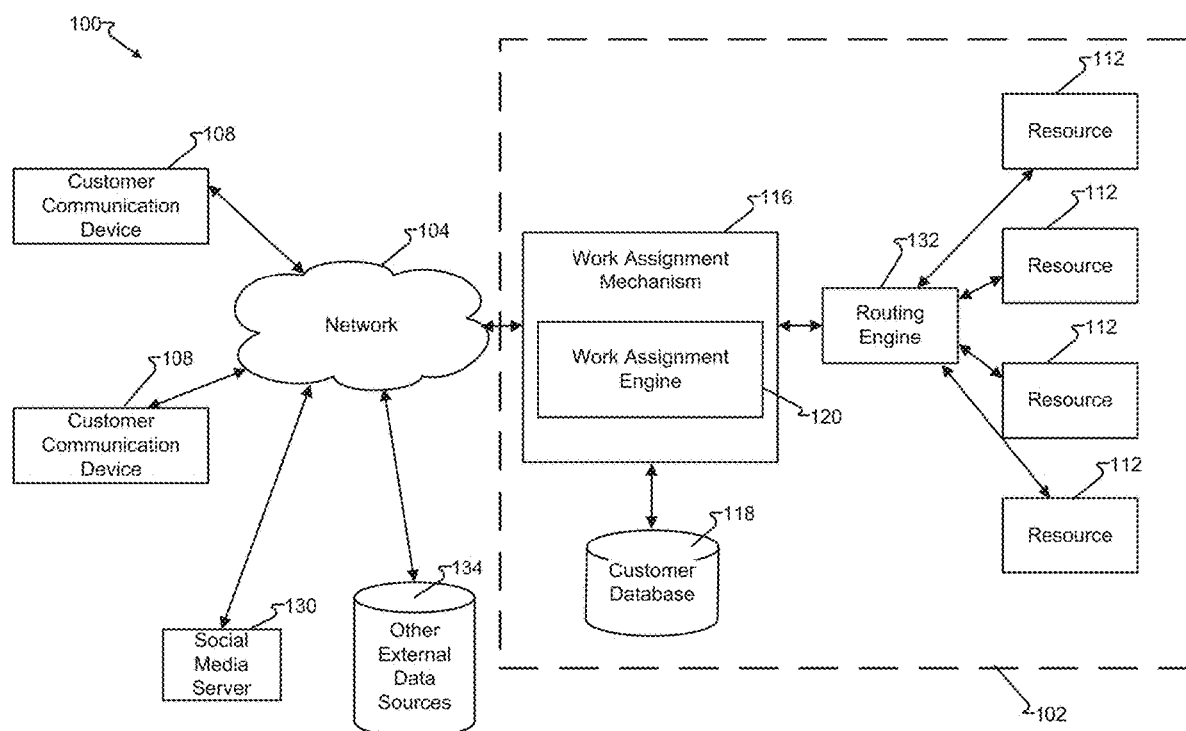
FIG. 1 depicts a first system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
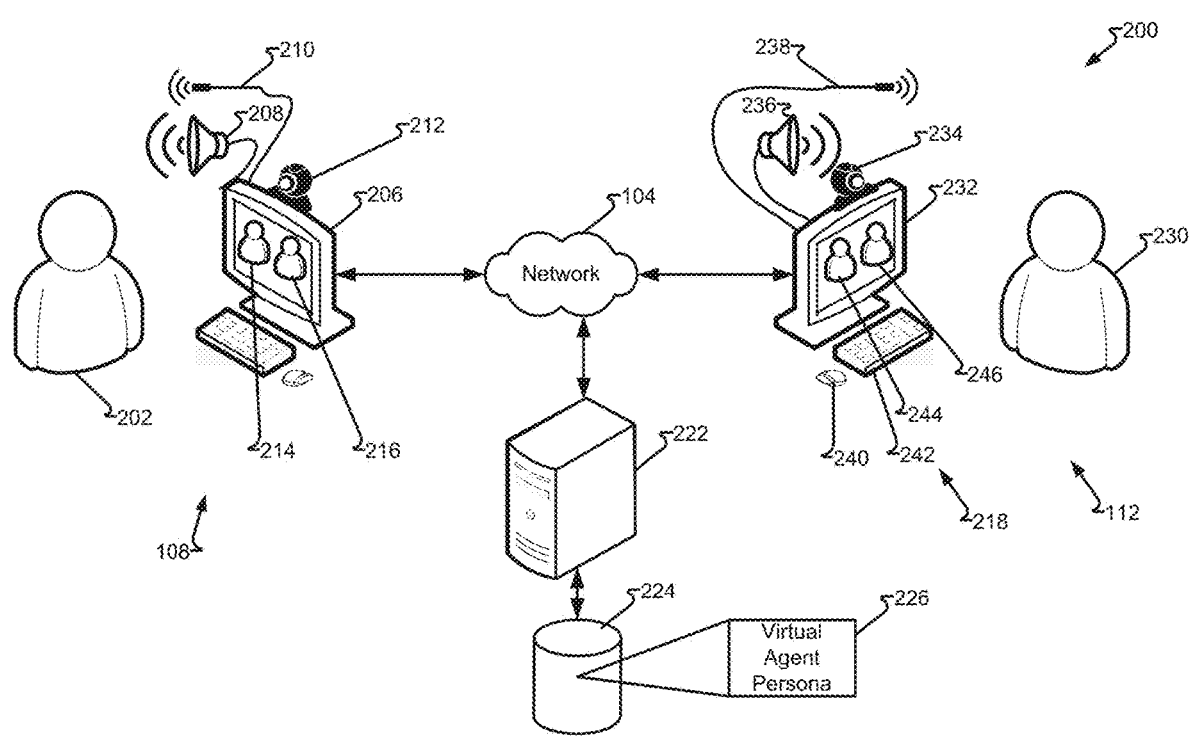
FIG. 2 depicts a second system in accordance with embodiments of the present disclosure.

FIG. 2 depicts system 200 in accordance with embodiments of the present disclosure. In one embodiment, system 200 comprises portions of system 100 some of which are omitted to avoid unnecessarily complicating the figure and associated description. System 200 illustrates customer 202, utilizing customer communication device 108, over network 104 to communicate with a particular resource 112 embodied as agent 230, being a live agent, utilizing agent communication device 218. In one embodiment, customer communication device 108 may be embodied as a voice-only communication device (e.g., audio telephone) utilizing customer speaker 208 to hear sound processed as encoded signals received from agent communication device 218 and customer microphone 210 to speak and have the speech encoded for presentation to agent communication device 218. Similarly, agent 230 may speak and have the speech received by agent microphone 238, encoded for transmission via network 104, and presented to customer 202 by customer speaker 208 and, in turn, hear speech form customer 202 presented by agent speaker 236. In another embodiment, customer communication device 108 may comprise video capabilities, such as to at least receive encoded video signals for presentation on customer display 206 and optionally provide video image captured by customer camera 212. Similarly, agent communication device 218 may comprise agent display 232 for the presentation of video image and agent camera 234 for capturing video images of agent 230.

Situations may occur where having a virtual agent may be helpful to advance a communication between customer 202 and agent 230 to a successful conclusion. For example, customer 202 may feel that agent 230 is not qualified, understanding, knowledgeable, and/or has any of a number of shortcomings such that customer 202 does not believe or trust agent 230. This may be the case even when agent 230 is qualified, understanding, knowledgeable, etc. For example, customer 202 may wish to dispute a bill and initiates contact with agent 230. Agent 230 informs customer 202 that the charge was legitimate and therefore cannot be removed. Customer 202 may be a habitual abuser of unjustified discounts that are offered to customers solely to maintain good customer relationships and, as a result, contact center 102 may have a ridged policy that caps such discount at 15%. The entity operating contact center 102 having made the decision that customers who make repeated unjustified complaints and ask for discounts will get less of a discount and eventually no discount. Returning to system 200, customer 202 has asked for a full reimbursement, but as an entry in customer database 118 indicates, customer 202 is becoming a habitual abuser of such discounts. Accordingly, agent 230 may inform customer 202 that they are not entitled to any discount and, in response, customer 202 may ask to speak to a supervisor. However, agent 230 knows that a live supervisor will not give customer 202 what they are asking for. Alternatively, a live supervisor may not be presently available. As a result, a virtual agent may join the call in a role of a supervisor. It should be appreciated that, in other embodiments, the roles may be reversed wherein agent 230 plays the role of a secondary agent (e.g., supervisor, expert, etc.) brought into the call after the virtual agent has already been utilized in the communication.

In another embodiment, server 222 accesses data storage 224 comprising virtual agent persona record 226 and, via a network interface, connects to the communication between customer 202 and agent 230. In one embodiment, the communication is audio-only and server 222 provides speech having the characteristics determined by virtual agent persona record 226 (e.g., tone, pace, accent, etc.). The content "spoken" by the virtual agent may be provided entirely or partially by agent 230 via agent communication device 218 comprising agent microphone 238, mouse input device 240, keyboard input device 242, and/or other input device. For example, agent 230 may provide inputs to keyboard input device 242 and type out an explicit message, "This is Supervisor Smith, how can I help?" and, in response, at least one processor of server 222 generates speech in the voice of the virtual agent for transmission via network 104, and presentation by customer speaker 208 to customer speaker 208. In another embodiment, agent communication device 218 may present one or more previously determined phrases selectable, such as via an input utilizing mouse input device 240 or other input device that are played back or generated from text as the virtual agent. In yet another embodiment, agent 230 may provide an input (e.g., via mouse input device 240 and/or keyboard input device 242) to signal at least one of agent communication device 218 and/or server 222 that they are about to provide speech as the virtual agent. As a result, agent 230 speaks, "This is Supervisor Smith, how can I help?" which is not provided to customer communication device 108 but is provided to server 222 that, utilizing virtual agent persona record 226, converts the pattern of speech provided by agent 230 into a pattern of speech for the virtual agent. The virtual agent's speech is then provided to customer communication device 108. As will be discussed more completely, with respect to FIGS. 3-4, similar techniques may utilized for the video content.

In another embodiment, the communication between customer 202 and agent 230 may comprise video. A virtual agent may then be utilized to provide speech as well as visual content. Agent display 232 may present customer image 244 and virtual agent image 246 on agent display 232 and customer display 206 may present presented image of live agent 214 and presented image of virtual agent 216. Virtual agent image 246 and presented image of virtual agent 216 being generated by server 222 utilizing virtual agent persona record 226 to generate the appropriate static and dynamic visual features of the virtual agent, as well as spoken attributes, as described above.

Returning to the example, customer 202 may plead their case for a full discount to the virtual agent. The response may be to completely support the initial response provided by agent 230 to customer 202 (e.g., no discount) or, as policy dictates, give customer 202 the appearance of a win and cause the virtual agent to offer a partial discount, such as 15%. This may involve a back-and-forth between agent 230 and the virtual agent as controlled by agent 230, such as to give customer 202 the impression that the virtual agent is an ally of customer 202 against agent 230 who is being rigid, so as to believe the virtual agent (e.g., a supervisor) that all that can be done is a small discount, but remains a victory over agent 230 who was offering no discount. As can be appreciated, the roles played by agent 230 and agent 230 controlling the virtual agent may be simple or complex.

In another embodiment, statistics may be maintained as to which agents and/or which techniques are most successful for a given situation. For example, customers or subject matter may warrant "good cop, bad cop" roles, wherein one of the virtual agent or live agent is highly supportive of the customer's request and the other rigidly refuses. Another role may be banter, such as wherein one of the live agent or virtual agent gives a partial suggestion and the other provides an additional or alternative suggestion, such as to lend gravitas to the first suggestion. For example, one agent (of the live or virtual agents) may offer, "your router isn't acting as expected, let's do a cold restart." Wherein the second agent (the other of the live or virtual agent) may suggest, "That's a good idea, but before we do that, have you checked to see if the firmware is up to date?" To which the first agent may respond, "Yes, we should do that. We'll need to do a cold restart after that anyway." Accordingly, if the "team" approach allowed the communication to be more successful (e.g., the customer is satisfied and/or the overall communication length is reduced over more traditional single agent involvement), then such communications may be provided as a standard library of sayings/roles to other agents having similar communications. Similarly, roles and/or expressions with or by a virtual agent that do not lead to a successful conclusion (e.g., sale not made, communications take longer, customer dissatisfied, etc.) may be recorded and provide an trigger for training and/or discontinuation of certain roles/expressions.

Figure 3:
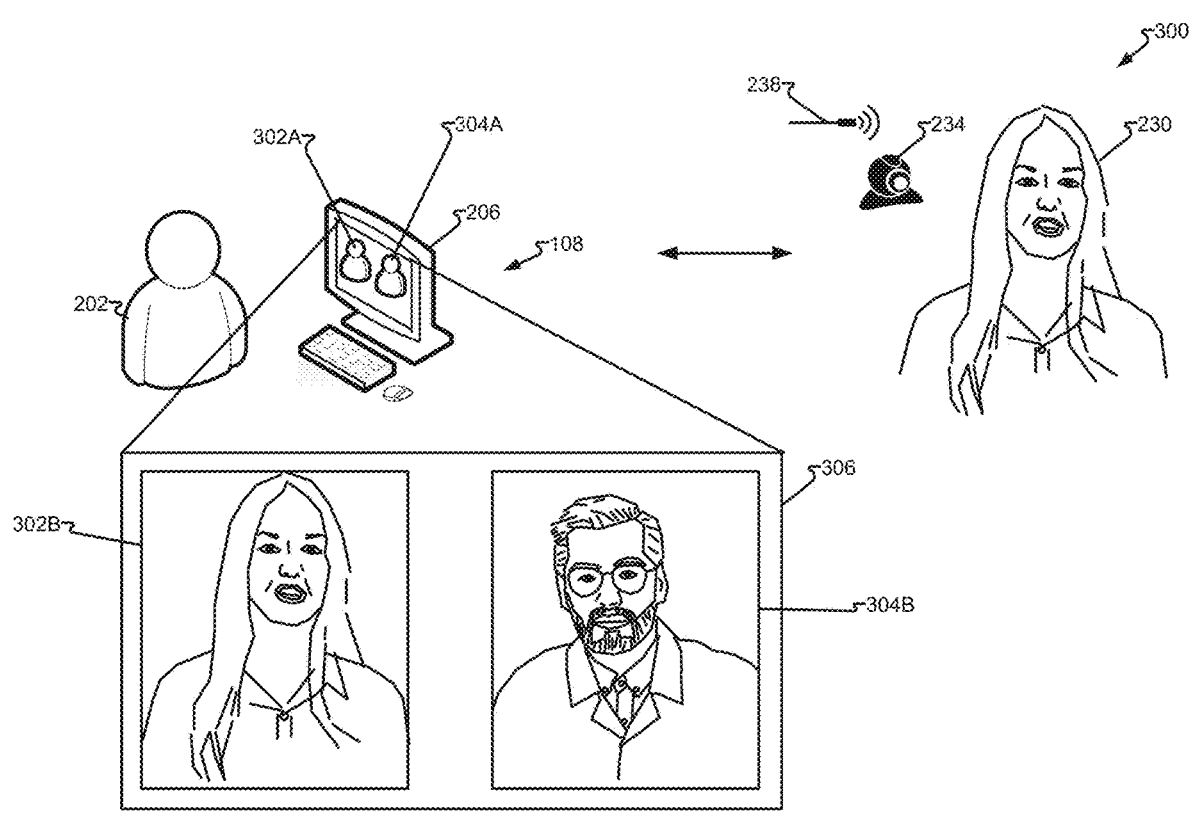
FIG. 3 depicts a first communication in accordance with embodiments of the present disclosure.

FIG. 3 depicts communication 300 in accordance with embodiments of the present disclosure. In one embodiment, communication 300 utilizes configured hardware of system 100 and/or system 200, which is omitted as a matter of convenience to avoid unnecessarily complicating the figure and associated description. Communication 300 comprises customer 202, agent 230, and a virtual agent engaged in a three-way communication—as presented on customer communication device 108. Communication 300 may comprise agent 230 who is currently speaking, and the speech being received by agent microphone 238. The image of agent 230 speaking being captured by agent camera 234 and presented on customer display 206 as agent image 302A. A virtual agent is present and currently "listening" and/or "watching" the communication between agent 230 and customer 202. The image of the virtual agent, generated by server 222, is presented on customer display 206 as virtual agent image 304A. Customer display 206 may present display window 306 presented on customer display 206, enlarged to show detail, and presenting agent image 302B and virtual agent image 304B. Visually, virtual agent image 304 appears to participate in the communication and, although controlled in whole or in part by agent 230, is presented on customer communication device 108 as responding independently of agent 230.

Figure 4:
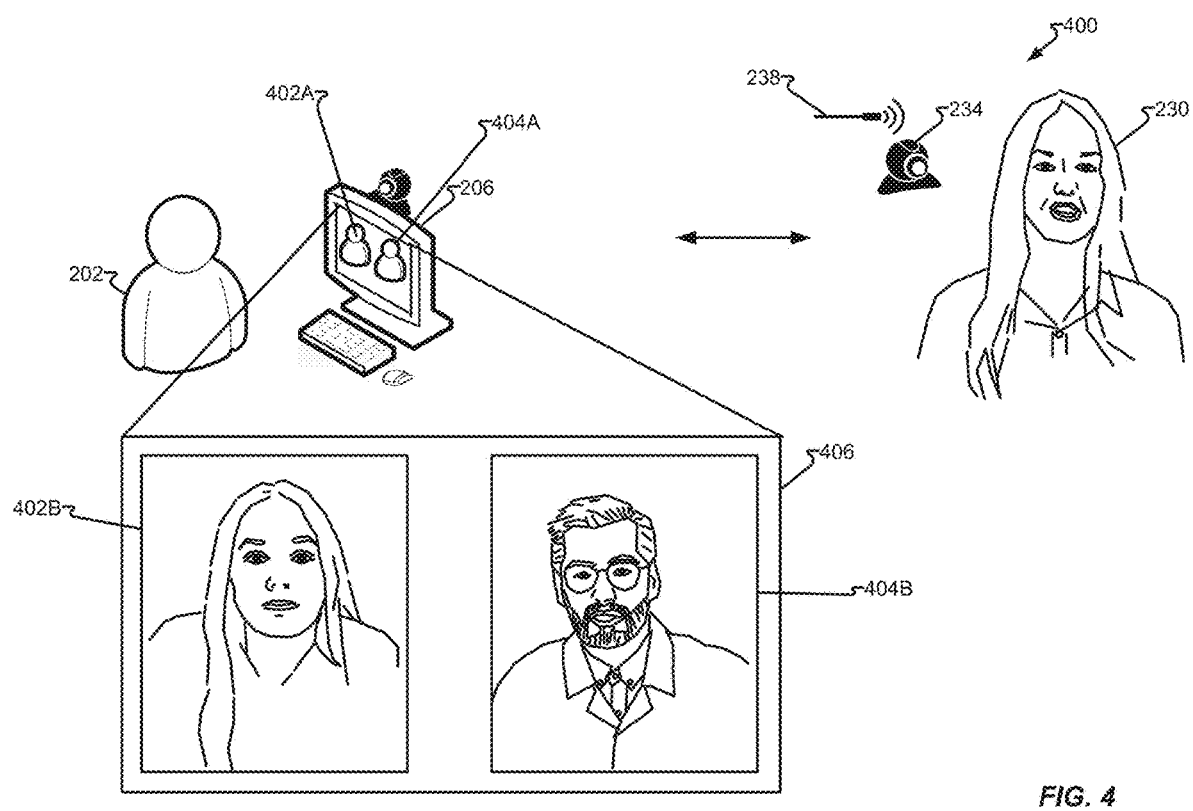
FIG. 4 depicts a second communication in accordance with embodiments of the present disclosure.

FIG. 4 depicts communication 400 in accordance with embodiments of the present disclosure. In one embodiment, communication 400 utilizes configured hardware of system 100 and/or system 200, which is omitted as a matter of convenience to avoid unnecessarily complicating the figure and associated description. As discussed above, the speech and/or gestures provided by the virtual agent is provided by agent 230 either as explicit content (e.g., typing content to be generated as speech originating from the virtual agent) or as a selection of "canned" expressions and/or gestures selectable via an input to agent communication device 218 (e.g., "Press 1 to have the virtual agent say, 'I agree.' Press 2 to have the virtual agent nod their head in agreement," etc.). However, it may be necessary to have agent 230 explicitly provide the speech for the virtual agent, such as via keyboard input device 242 wherein the entered text is generated as speech of the virtual agent and/or speaking the content.

In one embodiment, agent communication device 218 receives an input and provides a signal to server 222 that agent 230 is providing content as the virtual agent. As discussed above, the sound captured, such as by agent microphone 238 is not directly provided to customer communication device 108, but rather processed by server 222 to have the sound quality of the virtual agent and the virtual agent then appears to be providing the speech. However, speaking is also a visual action. More specifically, the virtual agent needs to visually appear to be speaking and agent 230 needs to appear as not speaking. While some agents may have ventriloquism skills, such as to speak well without moving their mouth or lips, and therefore only rely on voice processing and virtual agent movement generation. However, for many agents, they will need to speak naturally wherein a processor, such as a processor of server 222 both presents the live agent as not speaking and the virtual agent as speaking, as well as providing the speech in the voice of the virtual agent.

In one embodiment, agent 230 is speaking, the sound is received by agent microphone 238 and visually received (e.g., mouth movement, jaw movement, etc.) by agent camera 234. However, in response to a signal from agent communication device 218, server 222 knows that the speech provided by agent 230 is for presentation as the virtual agent. Accordingly, server 222 provides an image of agent 230 as agent image 402 on customer display 206, shown in greater detail as agent image 402B in display window 406 presented on customer display 206. Agent image 402 comprises an entire or partial overlay or other video manipulation to present agent image 402 as agent image 302 who is not speaking, as presented on customer display 206. In another embodiment, virtual agent image 404, illustrated in greater detail as virtual agent image 404B in display window 406, is presented as speaking the content being provided by agent 230.

Control of the virtual agent may be transferred to a second live agent, such as a second live agent who resembles the virtual agent. As a benefit, a request to include another agent in the communication, but the other agent is not presently available, may initially be conducted with the virtual agent being controlled by agent 230 and, once the second agent becomes available, controlled by the second agent. The second agent's inputs may continue server 222 generation of speech and/or visual elements of virtual agent image 404 or, if virtual agent persona record 226 is sufficiently accurate representation of the second agent, the live audio and/or video of the second agent may be provided directly into the communication and the virtual agent discontinued.

Figure 5:
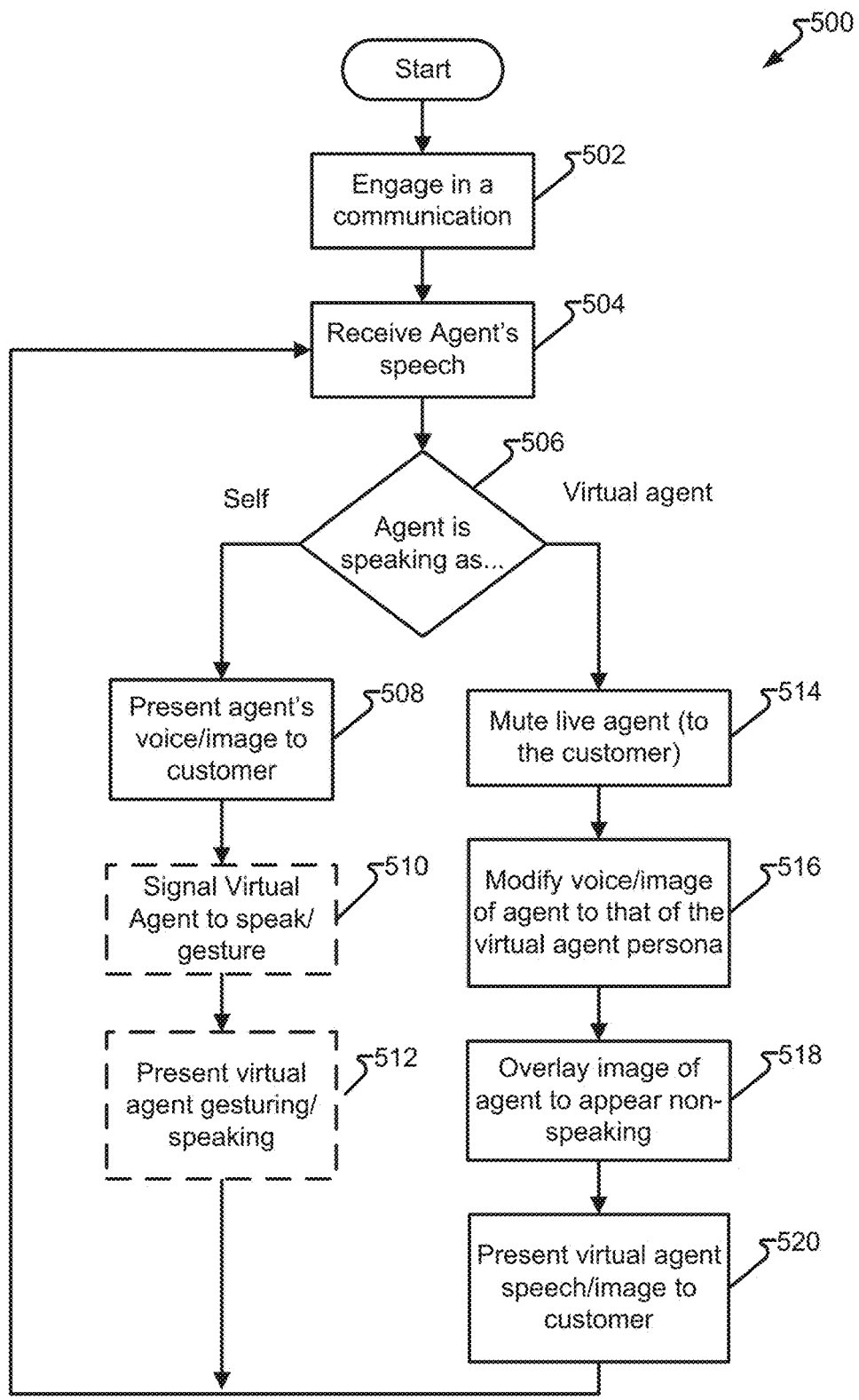
FIG. 5 depicts a process in accordance with embodiments of the present disclosure.

FIG. 5 depicts process 500 in accordance with embodiments of the present disclosure. In one embodiment, process 500 is embodied as machine-readable instructions maintained in a non-transitory memory to cause a processor, such as a processor of server 222 and/or agent communication device 218, to perform the steps of process 500. In step 502, a customer, such as customer 202 is engaged in a communication with an agent. The agent may be initially be a live agent, such as agent 230 or a virtual agent with the other of a virtual agent or agent 230 joining (as presented on customer communication device 108) at a subsequent time or as both agent 230 and the virtual agent being engaged at the start of the communication.

Step 504 receives the live agent's (e.g., agent 230) speech and, based on a signal received at a processor, test 506 determines if the speech provided is to be presented to customer communication device 108 as the live agent or as the virtual agent. If test 506 determines the speech is to be provided as the live agent him or herself, processing continues to step 508 wherein the agent's voice and video, when utilized, are presented to customer communication device 108 as agent 230. Optionally, even though agent 230 is speaking, the virtual agent may provide speech and/or visual response based on signals received from agent 230, such as via agent communication device 218 to cause the virtual agent to gesture and/or provide other "canned" audible and/or visual element. For example, step 510 may signal the virtual agent to nod in agreement and "say" a previously recorded and/or generate speech from typed or selected text message, such as, "that's a good point." Then, in step 512, the virtual agent speaks and/or provides the visual appearance (e.g., nodding, appearing to speak, etc.) of the signal received in step 510.

If test 506 determines that the speech provided is to be presented as from the virtual agent, then step 514 mutes the sound captured by agent microphone 238 with respect to the communication and prevents the sound from being presented on customer speaker 208 of customer communication device 108. Step 516 modifies the voice and, if video, image of the agent to cause the virtual agent, as presented on customer display 206 of customer communication device 108, to visually appear to be speaking as well as having a voice with the sound attributes, different from agent 230, as determined by virtual agent persona record 226.

Step 518 overlays the image of agent 230 in its entirety or a portion (e.g., lips, jaw, etc.) thereof, to cause agent 230, as presented on customer communication device 108 to not visually appear to be speaking. Step 520 presents the virtual agent, on customer communication device 108, as audibly and visually speaking the content provided by agent 230 while the image/sound of agent 230, as presented on customer communication device 108 is that of agent 230 being silent.

Figure 6:
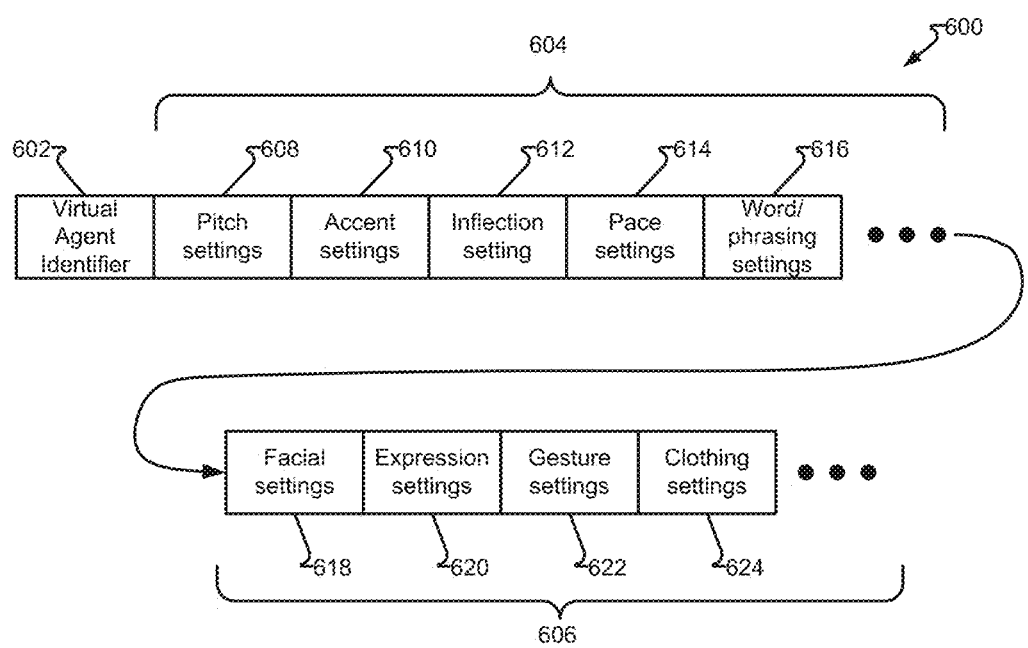
FIG. 6 depicts a data structure in accordance with embodiments of the present disclosure.

FIG. 6 depicts data structure 600 in accordance with embodiments of the present disclosure. In one embodiment, data structure 600 comprises a record maintained in data storage 224 as virtual agent persona record 226. Data structure 600 may comprise a virtual agent identifier field 602, such as to uniquely identify a virtual agent and/or category of agent. For example, when waiting for a live second agent, a virtual agent having characteristics of the live second agent may be utilized and accessed, at least in part by virtual agent identifier field 602.

Data structure 600 may comprise audio settings 604 and/or video settings 606. Audio settings 604 may comprise one or more of pitch settings 608, accent settings 610, inflection settings 612, pace settings 614, and/or word/phrase settings 616. Word/phrase settings 616 may comprise alternative phrasing and/or word choice. For example, if a live agent (e.g., agent 230) is formal and says, "Yes, that is correct," the virtual agent may be more causal and, as a result, use alternative phrasing from word/phrasing settings 616, such as, "Yeah, you got it," to be more informal. Additionally or alternatively, word/phrasing settings 616 may comprise one or more standard phrases to be selected by agent 230. For example, agent 230 may want the virtual agent to agree with something said by agent 230 and be presented with an "agreement" option on agent communication device 218. When selected, the virtual agent may say one of a number of phrases or utterances (e.g., "yeah," "right," "correct," "uh huh," etc.). The particular phrase may be selected randomly, sequentially, or other selection means.

Video settings 606 may comprise one or more of facial settings 618, such as the visualization of speech (e.g., position and movement of lips, jaw, tongue, etc.) for a word, utterance, or phoneme. Expression settings 620 to define image movements and/or body positions to provide a particular expression (e.g., raising an eyebrow to show confusion or surprise, nodding in agreement or disagreement, etc.), gesture settings 622 maintains the settings for other gestures, such as movements of the hands, clothing settings 624 maintains settings for visual components related to general appearance (e.g., clothing, makeup, jewelry, etc.) that may be static or vary from call-to-call.

Fields of data structure 600 may be descriptors for how an image should be modified (e.g., stretch a facial portion to mimic a particular phoneme being spoken) or settings for such an image to be generated (e.g., draw a polygon having vectors a, b, c, d at with a color-fill gradient from left to right . . . , etc.).

As a result of a processor, such as a processor of server 222 and/or agent communication device 218 reading data structure 600, a virtual agent having a persona described by data structure 600 may be generated and presented to customer communication device 108, agent communication device 218, and/or other communication device.

Figure 7:
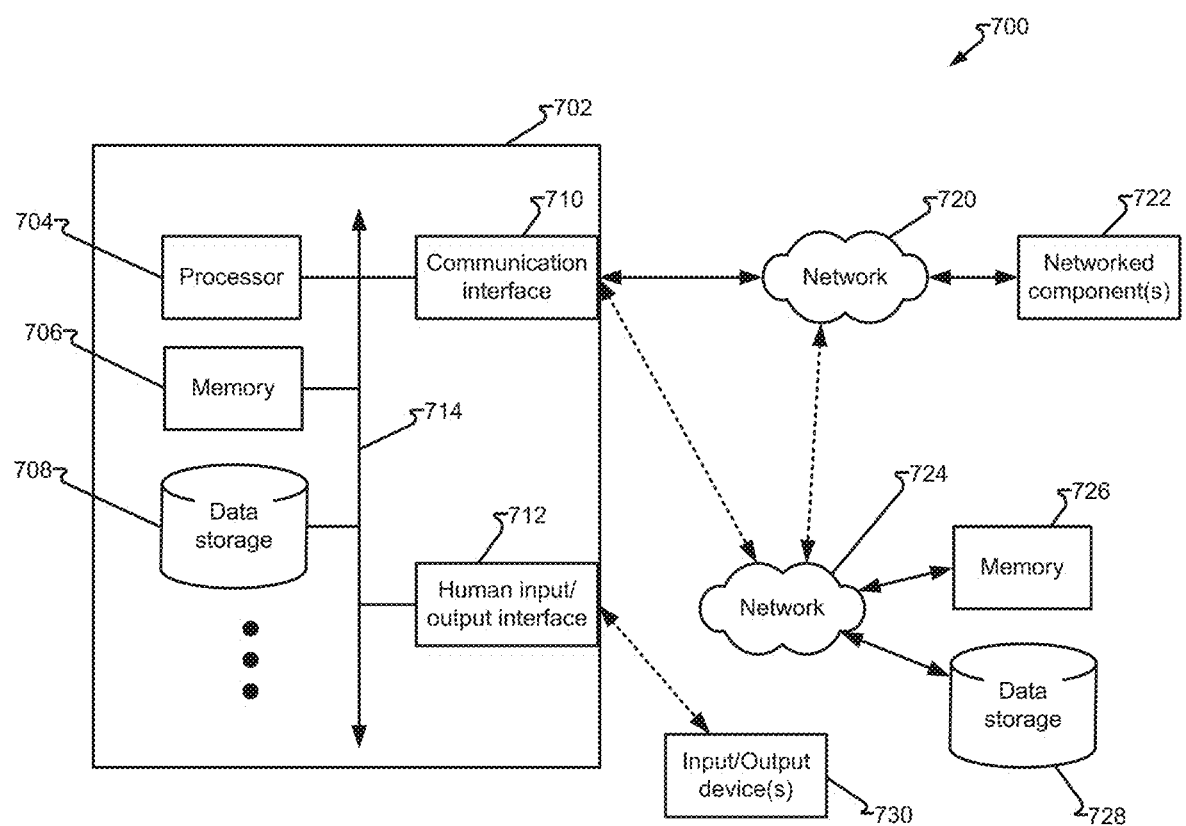
FIG. 7 depicts a third system in accordance with embodiments of the present disclosure.

FIG. 7 depicts device 702 in system 700 in accordance with embodiments of the present disclosure. In one embodiment, server 222 and/or agent communication device 218 may be embodied, in whole or in part, as device 702 comprising various components and connections to other components and/or systems. The components are variously embodied and may comprise processor 704. The term "processor," as used herein, refers exclusively to electronic hardware components comprising electrical circuitry with connections (e.g., pin-outs) to convey encoded electrical signals to and from the electrical circuitry. Processor 704 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 704). Processor 704 may be executed by virtual processors, such as when applications (i.e., Pod) are orchestrated by Kubernetes.

Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, etc. In another embodiment, communication interface 710 may comprise, or be comprised by, human input/output interface 712. Communication interface 710 may be configured to communicate directly with a networked component or utilize one or more networks, such as network 720 and/or network 724.

Network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with network component(s) 722. In other embodiments, network 720 may be embodied, in whole or in part, as a telephony network (e.g., public switched telephone network (PSTN), private branch exchange (PBX), cellular telephony network, etc.)

Additionally or alternatively, one or more other networks may be utilized. For example, network 724 may represent a second network, which may facilitate communication with components utilized by device 702. For example, network 724 may be an internal network to a business entity or other organization, such as contact center 102, whereby components are trusted (or at least more so) that networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112. Similarly, one particular networked component 722 and/or resource 112 may be enabled (or disabled) from communicating with a particular other networked component 722 and/or resource 112, including, in certain embodiments, device 702 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a communication interface to a network;
   a processor comprising machine-readable instructions maintained in a non-transitory memory;
   a first agent communication device comprising an input device and a microphone and utilized by a live agent;
   a data storage; and
   wherein a first agent, via the first agent communication device, is engaged in a communication with a customer, utilizing a customer communication device, and wherein the communication comprises speech encoded for transmission on the network; and
   wherein the instructions cause the processor to perform:
      accessing an agent persona, from the data storage, comprising settings of characteristics to generate speech of a virtual agent different from the speech of the first agent and wherein the agent persona further comprises settings to generate a video image of the virtual agent having visual characteristics different from an image of the first agent;
      receiving content, via the input device;
      generating speech of the content in a voice of the agent persona;
      providing the generated speech as a portion of the communication; and
      providing the video image of the virtual agent as a video portion of the communication.

2. The system of claim 1, wherein the input device comprises a keyboard and the processor performs generating the speech from text entered via the keyboard.

3. The system of claim 1, wherein the instructions cause the processor to further receive a signal sent from the input device and, in response, receive the content as speech from the microphone, block the speech of the first agent from being provided to the customer communication device, and generate the speech comprising converting the speech of the first agent to a voice of the virtual agent and providing the voice of the virtual agent to the communication.

4. The system of claim 1, further comprising:
   a camera receiving a video image of the first agent, wherein the image is encoded for transmission on the network; and
   wherein the instructions cause the processor to provide as the video image of the virtual agent in the communication, the video image of the virtual agent with a characteristic of the first agent in a video image of the first agent while maintaining a visual appearance of the virtual agent as distinct from the first agent.

5. The system of claim 4, wherein the characteristic comprises at least one of gesture, clothing, facial expression, or pattern of speech.

6. The system of claim 1, wherein the instructions further cause the processor to perform:
   receiving a signal sent from the input device and, in response thereto, further receiving the content as speech from the microphone, blocking a video image of the first agent's face, comprising at least a mouth portion, with an overlay to present a video image of the first agent as not speaking while the video image of the virtual agent is speaking.

7. The system of claim 6, wherein the instructions cause the processor to animate the video image of the virtual agent's face, comprising at least the mouth portion, to mimic facial movements of the first agent while the first agent speaks.

8. The system of claim 1, wherein the system further comprises:
   a second agent communication device utilized by a second agent; and
   wherein the instructions further cause the processor to receive a signal sent from at least one of the first agent communication device and the second agent communication device and, in response thereto, discontinue receiving the content from the first agent communication device and receives content from the second agent communication device.

9. The system of claim 8, wherein the agent persona substantially matches a persona of the second agent.

10. A method, comprising:
    engaging in a communication between a customer, utilizing a customer communication device connected to a network, and a first agent, utilizing a first agent communication device connected to a network, and wherein the communication comprises speech encoded for transmission on the network;

accessing an agent persona, from a data storage, comprising settings of characteristics to generate speech of a virtual agent different from the speech of the first agent and generating a video image of the virtual agent having visual characteristics different from an image of the first agent;

receiving content, via an input device associated with the first agent communication device;

generating speech of the content in a voice of the agent persona;

providing the generated speech as a portion of the communication; and providing the video image of the virtual agent as a video portion of the communication.

11. The method of claim 10, wherein the input device comprises a keyboard and generating speech comprises generating speech from text entered via the keyboard.

12. The method of claim 10, further comprising:
receiving a signal sent from the input device and, in response, receiving the content as speech from a microphone capturing sound from the first agent, blocking the speech of the first agent from being provided to the customer communication device, and generating the speech comprising converting the speech of the first agent into a voice of the virtual agent; and providing the voice of the virtual agent to the communication.

13. The method of claim 10, further comprising:
receiving a video image of the first agent from a camera capturing an image of the first agent, wherein the image is encoded for transmission on the network; and providing the video image of the virtual agent in the communication, the video image of the virtual agent having characteristics of the first agent in the video image of the first agent while maintaining a visual appearance of the virtual agent as distinct from the first agent.

14. The method of claim 13, wherein the characteristics comprise at least one of gesture, clothing, facial expression, or pattern of speech.

15. The method of claim 10, further comprising receiving a signal sent from the input device and, in response thereto, further receiving the content as speech from a microphone, blocking a video image of the first agent's face, comprising at least a mouth portion, with an overlay to present the image of the first agent as not speaking while the video image of the virtual agent is speaking.

16. The method of claim 15, wherein further comprising animating the video image of the virtual agent's face, comprising at least the mouth portion, to mimic facial movements of the first agent while the first agent speaks.

17. The method of claim 10, further comprising:
receiving a signal sent from at least one of the first agent communication device and a second agent communication device and, in response thereto, discontinuing receiving the content from the first agent communication device and receiving content from the second agent communication device.

18. An agent communication device for communicating, via a network with a customer communication device, comprising:

a communication interface to the network;
a processor, comprising machine-readable instructions maintained in a non-transitory memory;
a microphone capturing speech of an agent;
a camera capturing a video image of the agent;
a data storage; and
wherein the agent, utilizing the agent communication device, is engaged in a communication with a customer, utilizing the customer communication device, and wherein the communication comprises speech encoded for transmission on the network; and wherein the instructions cause the processor to perform:
accessing a virtual agent persona, from the data storage, comprising settings of characteristics to generate a virtual agent different from the agent;
generating the virtual agent to comprise speech of the agent and having a voice of the virtual agent persona;
generating a video image of the virtual agent having at least a movement as determined by a movement of the agent as captured in the video image of the virtual agent;
generating an altered video image of the agent having an appearance of not speaking while the video image of the virtual agent is speaking;
providing, as a portion of the communication, the video image of the virtual agent, the altered video image of the agent, and speech in the voice of the virtual agent persona; and
providing a generated speech as a portion of the communication.

19. The agent communication device of claim 18, wherein the instructions cause the processor to further receive a signal sent from the agent communication device and, in response, receive a portion of the communication as speech from the microphone, blocking the speech of the agent from being provided to the customer communication device, and generating the speech comprising converting the speech of the agent to a voice of the virtual agent and providing speech the voice of the virtual agent to the communication.

20. The agent communication device of claim 18, wherein the instructions further cause the processor to perform receiving a signal sent from the agent communication device and, in response thereto, further receiving a portion of the communication as speech from the microphone, blocking a video image of the agent's face, comprising at least a mouth portion, with an overlay to present an image of the agent as not speaking while the video image of the virtual agent is speaking.

* * * * *